US006785238B1

(12) United States Patent
Kago (10) Patent No.: US 6,785,238 B1
(45) Date of Patent: Aug. 31, 2004

(54) LAN RELAYING/SWITCHING APPARATUS (75) Inventor: Hiroaki Kago, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/418,459

(22) Filed: Oct. 15, 1999

(30) Foreign Application Priority Data

Mar. 18, 1999 (JP) ............................................ 11-073672

(51) Int. Cl.⁷ .......................... H04L 12/28; H04L 12/56

(52) U.S. Cl. .............................. 370/236.1; 370/395.52; 370/414; 709/232; 709/238

(58) Field of Search ................................. 370/229, 230, 370/230.1, 231, 235, 236, 236.1, 236.2, 352, 389, 395.1, 395.5, 395.52, 401, 412, 413, 414, 428, 429; 709/230, 232, 234, 235, 238, 240

(56) References Cited

U.S. PATENT DOCUMENTS

| | | | | |
|---|---|---|---|---|
| 5,867,663 A | * | 2/1999 | McClure et al. | 395/200.64 |
| 5,978,359 A | * | 11/1999 | Caldara et al. | 370/236 |
| 5,987,008 A | * | 11/1999 | Simpson et al. | 370/236 |
| 6,141,323 A | * | 10/2000 | Rusu et al. | 370/236 |
| 6,144,640 A | * | 11/2000 | Simpson et al. | 370/236 |
| 6,208,653 B1 | * | 3/2001 | Ogawa et al. | 370/395.52 |
| 6,424,622 B1 | * | 7/2002 | Fan et al. | 370/230 |
| 6,426,957 B1 | * | 7/2002 | Hauser et al. | 370/413 |
| 6,456,590 B1 | * | 9/2002 | Ren et al. | 370/229 |
| 6,490,248 B1 | * | 12/2002 | Shimojo | 370/229 |

* cited by examiner

Primary Examiner—Alpus H. Hsu
(74) Attorney, Agent, or Firm—Katten Muchin Zavis Rosenman (57) ABSTRACT In a LAN relaying/switching apparatus accommodating many LAN transmission lines, a controller performs a flow control which limits a data transmission for terminal portions which have inputted the data in which an output queue of a queue portion included in queue management module portions has exceeded a preset threshold value.

17 Claims, 10 Drawing Sheets

| VERSION (4bits) | INTERNET HEADER LENGTH (4bits) | TYPE OF SERVICE (8bits) | TOTAL LENGTH (16bits) | IDENTIFI- CATION (16bits) | FLAGS (3bits) | FRAGMENT OFFSET (13bits) | TIME TO LIVE (8bits) | PROTOCOL TYPE (8bits) | HEADER CHECKSUM (16bits) | SOURCE IP ADDRESS (32bits) | DESTINATION IP ADDRESS (32bits) | DATA |

| SOURCE PORT NO. (16bits) | DESTINATION PORT NO. (16bits) | SEQUENCE NO. (32bits) | ACKNOWLEDGEMENT NO. (32bits) | DATA OFFSET (4bits) | RESERVED (6bits) | CONTROL bits (6bits) | WINDOW SIZE (16bits) | CHECKSUM (16bits) | URGENT POINTER (16bits) | DATA |

| SOURCE PORT NO. (16bits) | DESTINATION PORT NO. (16bits) | UDP DATA LENGTH (16bits) | CHECKSUM (16bits) | DATA |

PRIOR ART

LAN RELAYING/SWITCHING APPARATUS

BACKGROUND OF THE INVENTION

1. Field of the Invention

The present invention relates to a LAN relaying/switching apparatus, and in particular to a LAN relaying/switching apparatus which accommodates many LAN transmission lines.

In recent years, LAN transmission lines have been made to have a high-speed and large capacity so that it has been required in the LAN relaying/switching apparatus where many LAN transmission lines are concentrated to suppress the spread of faults having occurred in a part of the transmission lines to the other normal transmission lines.

2. Description of the Related Art

Figure 10:
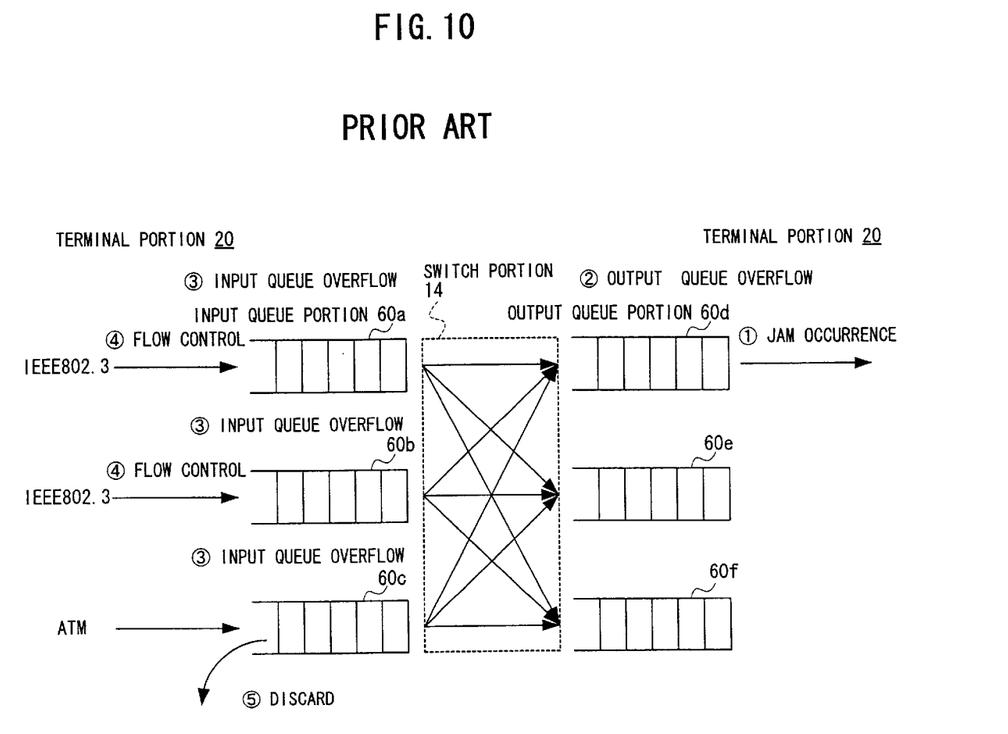
FIG. 10 is a diagram showing an example of a flow control of a conventional LAN relaying/switching apparatus.

FIG. 10 shows an arrangement of a conventional LAN relaying/switching apparatus. This relaying/switching apparatus is composed of terminal portions 20 on the input side and the output side of the apparatus which terminate transmission lines, a switch portion 14 which exchanges data from the terminal portions 20 on the input side and provides the same to the terminal portions 20 on the output side, and queue portions 60a–60c and 60d–60f respectively arranged on the input side and the output side of the switch portion 14 for establishing data forwarding paths.

In this arrangement, the terminal portions 20 on the input side are composed of two terminal portions based on the IEEE802.3 and a single ATM terminal portion so that the terminal portions of different interfaces exist together.

In such a conventional LAN relaying/switching apparatus having physical interface terminal portions based on the IEEE802.3, a jam state ①, caused in the transmission line on the output side for instance, causes an overflow state ② in the output queue portion 60d placed in front of the terminal portions 20 which terminate the transmission line. The overflow state ② causes an overflow state ③ in the queue portions 60a–60c on the input side which transmit the data to the queue portion 60d.

Being based on the IEEE802.3 in this case, the terminal portions 20 detect the overflow state ③ of the queue portions 60a and 60b on the input side, perform a flow control ④ a regulated by the IEEE802.3x and the IEEE802.3z, and suppress the data causing the overflow state ③.

On the other hand, the overflow state ③ of the queue portion 60c on the input side has no flow control corresponding to the IEEE802.3x and the IEEE802.3z since the terminal portion 20 on the input side is the ATM terminal portion. Therefore, it is impossible to selectively suppress the transmission of the data from the apparatus transmitting the data causing the overflow state ③. For this reason, there has been a problem that cells which have overflowed in the queue portion 60c on the input side are to be discarded as shown by ⑤.

SUMMARY OF THE INVENTION

It is accordingly an object of the present invention to provide a LAN relaying/switching apparatus which accommodates many transmission lines and suppresses the spread of jams caused in a part of the transmission lines to the other normal transmission lines.

In order to achieve the above-mentioned object, a LAN relaying/switching apparatus, according to claim 1, of the present invention comprises; a plurality of terminal portions for inputting data from an external apparatus, a queue portion for performing an input/output management for a switch portion of the data, and a controller for performing a flow control which limits a data transmission for the terminal portions which have inputted the data when a threshold value preset to an output queue of the queue portion is exceeded.

Namely, the data from an external apparatus is inputted to the queue portion through the terminal portions is queued until a path is set up at the switch portion, and is then transferred to the queue portion on the output side through the setup path. In the presence of a jam in the transmission line on the output side, the data is queued at the queue portion on the output side. When the queue (queued number) exceeds the preset threshold value, the controller performs the flow control for limiting the data transfer to the terminal portion which has inputted the data which has exceeded the threshold value.

This operation enables the transmission of the data causing a jam to be limited and prevents the data from overflowing and being lost at the queue portion.

Also, in the present invention according to claim 2, the controller may identify a real terminal portion based on an MAC address included in the data which has exceeded the threshold value.

Namely, the controller identifies the terminal portion from which the data is transmitted based on the MAC address included in the data which has exceeded the threshold value and limits the data transfer to the identified terminal portion.

Also, in the present invention according to claim 3, the controller may identify a real terminal portion based on an IP address included in the data which has exceeded the threshold value.

Furthermore, in the present invention according to claim 4, the controller may identify a real terminal portion based on protocol type information included in the data which has exceeded the threshold value.

Also, a LAN relaying/switching apparatus, according to claim 5, of the present invention may comprise; a plurality of terminal portions for inputting data from an external apparatus, a queue portion for performing an input/output management for a switch portion of the data, and a controller for performing a flow control which limits a specific data flow from the terminal portions where an output queue of the queue portion has exceeded a preset threshold value.

Namely, in the same way as the invention of claim 1, when the queue of the output queue portion has exceeded the threshold value the controller performs the flow control to the data. However, different from the invention of claim 1, this flow control is performed to a specific data flow at the time when the threshold value has been exceeded.

This enables the transmission of the specific data flow causing a jam to be limited and prevents the data from overflowing and being lost at the queue portion on the output side.

Also, in the present invention according to claim 6, the controller may identify the specific data flow based on an MAC address.

Also, in the present invention according to claim 7, the controller may identify the specific data flow based on an IP address.

Also, in the present invention according to claim 8, the controller may identify the specific data flow based on protocol type information.

Also, in the present invention according to claim 9, the controller may identify the specific data flow based on a TCP or UDP port number.

Also, in the present invention according to claim 10, the controller may identify the specific data flow based on a flow label in IPv6.

Moreover, in the present invention according to claim 11, the controller may identify the specific data flow based on one of VPI and VCI information in ATM.

Namely, in the present invention according to any one of claims 6–11, the controller may identify the specific data flow whose transmission is limited based on one of the MAC address, the IP address, the protocol type information, the port number, the flow label, as well as the VPI and VCI information included in the data flow at the time when the threshold value is exceeded.

Also, in the present invention according to claim 12, when any one of a plurality of threshold values which are preset is exceeded, the controller may perform the flow control which limits the specific data flow.

Namely, in the invention of claim 1, a single threshold value is set in the output queue portion, while in the present invention a plurality of threshold values are set. Thus, when the data flow exceeds one of the threshold values, the controller can perform a more minute flow control by limiting a specific data flow stepwise.

Also, a LAN relaying/switching apparatus, according to claim 13, of the present invention comprises; a plurality of terminal portions for inputting data from an external apparatus, a queue portion for performing an input/output management for a switch portion of the data, and a controller for identifying the terminal portions based on address information included in the data at the time when an output queue of the queue portion has exceeded a plurality of threshold values which are preset and for performing a flow control which limits a data transmission based on statistic information of a traffic amount for the identified terminal portions at the time when any one of the threshold values is exceeded.

Namely, in the present invention, the terminal portions which receive the data flow causing a jam are identified to have the flow control performed in the same way as the invention of claim 1. However, different from the invention of claim 1, a plurality of threshold values are set and when one of the threshold values is exceeded, the flow control is performed so as to more efficiently use the band capacity of the transmission line accommodated by the identified terminal portions based on the statistic information of the traffic amount.

This enables the controller to perform a more minute flow control and to efficiently use the transmission line.

Also, a LAN relaying/switching apparatus, according to claim 14, of the present invention comprises; a plurality of terminal portions including an ATM terminal portion for inputting data from an external apparatus, a queue portion for performing an input/output management for a switch portion of the data, and a controller for transmitting an RM (Resource Management) cell so as to limit the data flow from the ATM terminal portion when a data flow at the time when an output queue of the queue portion has exceeded a preset threshold value is a specific data flow from the ATM terminal portion.

This invention corresponds to the LAN relaying/switching apparatus where the terminal portions inputting the specific data flow are ATM terminal portions, in the invention of claim 5.

Namely, the controller transmits the RM cell which limits the band of the specific data flow from the ATM terminal portions to the apparatus transmitting the date flow causing a jam, thereby suppressing the data flow amount.

This enables the controller to perform the flow control to the data flow from the ATM terminal portions and to suppress the occurrence of a cell discard.

Also, in the LAN relaying/switching apparatus, according to claim 15, of the present invention, when the queue of the queue portion which transmits the specific data flow has exceeded a preset threshold value and the specific data flow is a data flow from the terminal portions based on IEEE802.3, the controller which has received the RM cell may perform a flow control so as to temporarily pause the data flow.

This invention relates to the LAN relaying/switching apparatus which has received the RM cell from the LAN relaying/switching apparatus of the invention according to claim 14.

Namely, when the terminal portions inputting the specific data flow designated by the RM cell are based on the IEEE802.3, the controller which has received the RM cell performs the flow control for temporarily pausing the transmission of the specific data flow from the terminal portions.

This enables the controller to perform the flow control to the data flow from the terminal portions based on the IEEE802.3 causing a jam of the transmission line connected to the ATM terminal portions.

Furthermore, in the LAN relaying/switching apparatus, according to claim 16, of the present invention, when the queue of the queue portion which transmits the specific data flow has exceeded a preset threshold value, the controller which has received the RM cell may perform a flow control to set a CLP (Cell Loss Priority) bit of cell in the specific data flow to non-priority.

Namely, when the queue of the queue portion transmitting the specific data flow has exceeded a predetermined threshold value, the controller which has received the RM cell from the LAN relaying/switching apparatus of the invention according to claim 14 sets the CLP bit of the cell in the specific data flow to non-priority. Then the controller transmits the CLP bit to the LAN relaying/switching apparatus from which the RM cell is transmitted.

If there is a possibility that the cell where the CLP bit is set to non-priority causes a jam, the LAN relaying/switching apparatus will discard the cell.

Also, in the LAN relaying/switching apparatus, according to claim 17, of the present invention, when a plurality of threshold values exist and the queue has exceeded any one of the threshold values, the controller may set the CLP bit to non-priority corresponding to the threshold value.

Namely, in the above-mentioned invention of claim 16, a plurality of threshold values are set in the queue portion. When the specific data flow has exceeded one of the threshold values, the controller sets the CLP bit of the cell in the specific data flow to non-priority at a stage corresponding to the threshold value.

This enables more cells based on the CLP bit to be discarded compared with the flow control in the invention of claim 16, resulting in a more minute control.

BRIEF DESCRIPTION OF THE DRAWINGS

Throughout the figures, like reference numerals indicate like or corresponding components.

DESCRIPTION OF THE EMBODIMENTS

Figure 1:
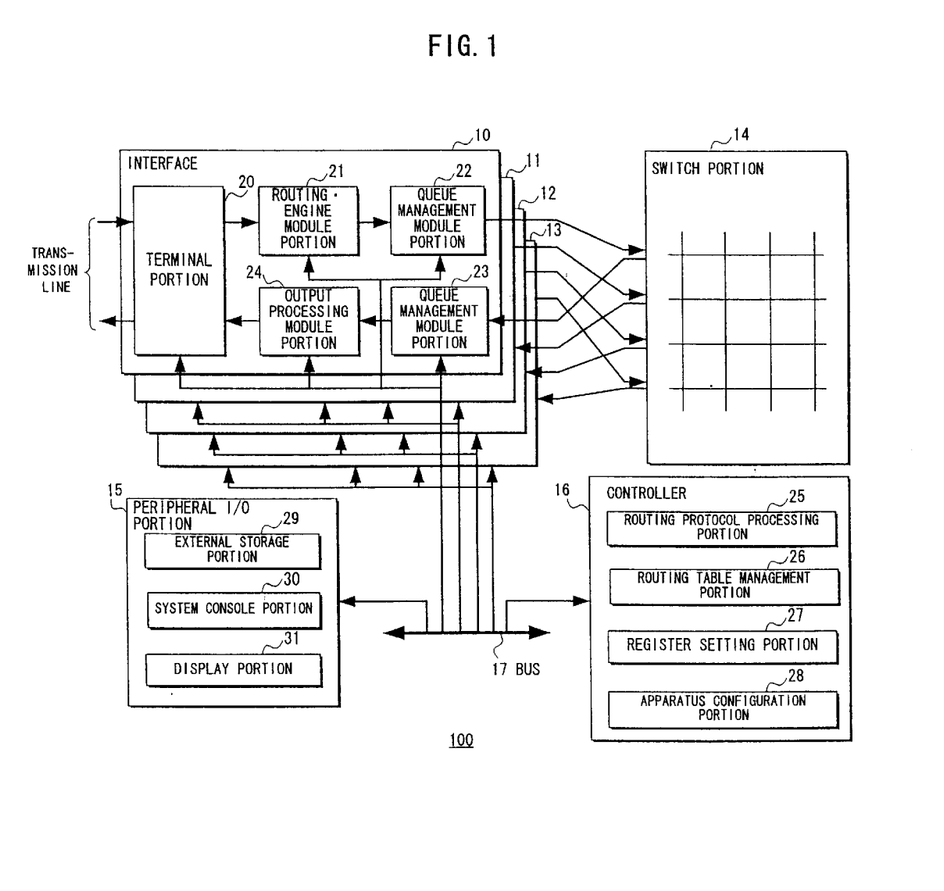
FIG.1 is a block diagram showing an embodiment of a LAN relaying/switching apparatus according to the present invention.

FIG. 1 shows an embodiment of a LAN relaying/switching apparatus 100 according to the present invention. In this embodiment, a LAN relaying/switching apparatus 100 schematically comprises a plurality of (four in this case) interfaces 10–13, a switch portion 14, a peripheral I/O portion 15, a controller 16 composed of a CPU and the like, and a bus 17 commonly connected to the above-mentioned portions.

The interfaces 10–13 are provided corresponding to various kinds of traffics, protocols and the like, each of which is respectively composed of a terminal portion 20, a routing-engine module portion 21, queue management module portions 22 and 23, and an output processing module portion 24.

Specifically, the terminal portion 20 converts an optical signal packet transmitted from the transmission line into an electrical signal if the transmission line is an optical fiber so that the packet can be processed in the apparatus 100 as the electrical signal.

Also, the terminal portion 20 forms an interface with an external apparatus (not shown) in a physical layer or a data link layer, and has a function of performing a format conversion into a frame form processed within the apparatus 100 in order that the frame used on the transmission line may not be different in form from an MAC frame, an IP frame processed, and the like within the apparatus for the detection of an error and the like generated in the middle of the transmission line.

In order to determine the transmission line on the transmission side, the routing-engine module portion 21 retrieves a routing table (not shown) stored therein with the information of the MAC address and the IP address of a transmitted frame as a key and determines the transmission line to be used.

The queue management module portion 22 holds a frame for the queuing operation until a path is set up to the interface where the determined transmission line on the transmission side exists. In this case, it is necessary to send a path setup request to the switch portion 14.

The queue management module portion 22 can send this path setup request based on the frame within the queue portion which will be described later. Also, this path setup request may be made by separately preparing a queue portion for the interface on the transmission side in the module portion 22 so that the queue management module portion 23 on the transmission side has an access to that queue portion of the module portion 22 on the reception side in a predetermined opportunity. It is to be noted that while various kinds of path setup methods are known, the present invention is not limited to those methods.

In addition, the switch portion 14 sets up a path which transmits a frame from the queue management module portion 22 on the reception side to the queue management module portion 23 on the transmission side.

The queue management module portion 23 on the transmission side receives a frame from the queue management module portion 22 on the reception side. In the state where the frame can be transmitted to the transmission line, the queue management module portion 23 sends the frame to the output processing module portion 24.

The output processing module portion 24 performs processings for the MAC frame and the IP frame such as a filtering and an address rewriting operation to provide the frames to the terminal portion 20, which then converts the frame formats into those on the transmission line to be transmitted.

The peripheral I/O portion 15 is composed of an external storage portion 29 such as a floppy disk, a system console portion 30, and an indicator portion 31 such as an LED.

Furthermore, the controller 16 is composed of a routing protocol processing portion 25 which controls the above-mentioned terminal portion 20 and the module portions 21–24, a routing table management portion 26, a register setting portion 27, and an apparatus configuration portion 28.

Figure 2:
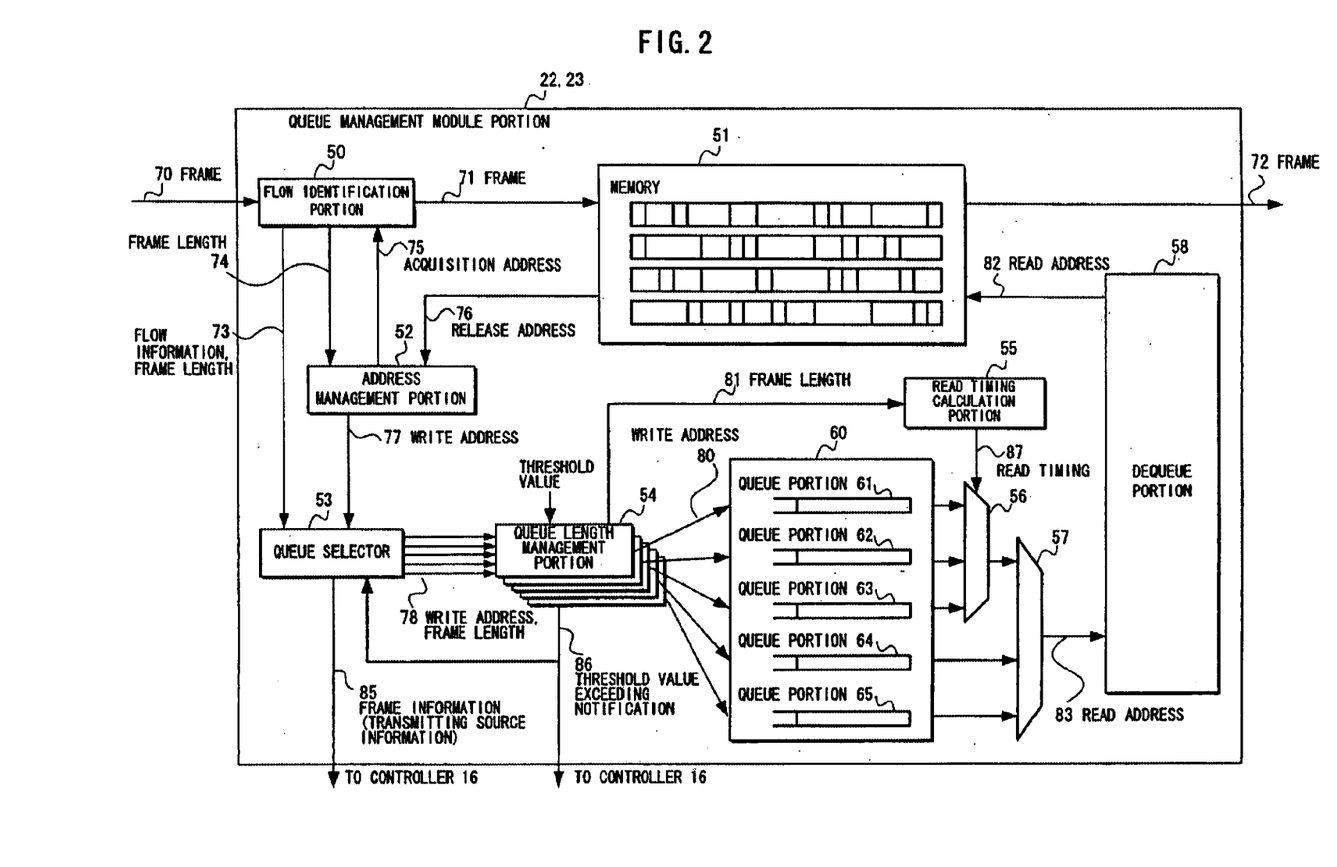
FIG. 2 is a block diagram showing an embodiment of a queue management module portion of a LAN relaying/switching apparatus according to the present invention.

FIG.2 shows an embodiment of the queue management module portions 22 and 23 shown in FIG. 1. In this embodiment, the queue management module portions 22 and 23 are respectively composed of a flow identification portion 50, a memory 51, an address management portion 52, a queue selector 53, queue length management portions 54, a read timing calculation portion 55, a queue portion 60, selectors 56 and 57, and a dequeue portion 58.

Specifically, the flow identification portion 50 identifies data flow information other than that of a receiving destination determined by the above-mentioned routing-engine module portion 21 and the like in case the flow identification portion 50 allocates a plurality of queue portions to a single receiving destination.

Moreover, the memory 51 stores a frame 71 proper received from the flow identification portion 50 until it is transmitted as a frame 72.

The address management portion 52 manages an unused address and a used address of the memory 51, and notifies an address 77 having a frame written to the queue selector 53.

The queue selector 53 selects one of the queue length management portions 54, i.e. any one of the queue portions 61–65 in the queue portion 60 for managing the information such as an address of the memory 51 where the frame entity is stored, and the frame length based on the data flow identified by the flow identification portion 50.

Also, receiving a threshold value exceeding notification 86 from the queue length management portions 54, the selector 53 transmits information on a source in the flow information of the overflowed data as frame information 85 to the controller 16 (see FIG. 1).

Each of the queue length management portions 54 manages the queue portions 61–65 based on a signal 78 indicative of a write address/frame length from the queue selector 53. Exceeding a threshold value, each of the queue portions 61–65 provides the threshold value exceeding notification 86 to the queue selector 53 and the controller 16. It is to be noted that a threshold value can also be set for each of the queue portions 61–65.

Upon allocating a plurality of queues to a single receiving destination, the read timing calculation portion 55 calculates an output timing depending on the significance of the frame which the queue handles to generate a read timing for each queue.

The queue portion 60 is composed of the queue portions 61–65 which store an address 80 having the frame 71 written in each data flow to which the frame 71 belongs.

The selector 56 reads the write address 80 stored in the queue portions 61–63 as a read address 83 at a read timing 87 from the read timing calculation portion 55, so that the selector 57 is set to preferentially output a read address 83 from the selector 56 and the read addresses from the queue portions 64 and 65 in a predetermined order (sequentially from top to bottom in the example of FIG.2).

Also, the dequeue portion 58 receives a read address 83 from the selector 57 and provides a read address 82 to the memory 51, from which the frame 72 is transmitted to the switch portion 14 at the next stage or the output processing module portion 24. When the transmission is completed, the dequeue portion 58 instructs the address management portion 52 to release the read address 82 as a release address 76.

The controller 16, as will be described hereinafter, decides a transmission line where a jam has occurred and the urgent degree based on the frame information 85 and the threshold value exceeding notification 86 received and determines a range for performing a flow control (a jam control) to transmit a flow control signal.

Hereinafter, flow control examples (1)–(5) of the LAN relaying/switching apparatus according to the present invention shown in FIGS. 1 and 2 will be described respectively referring to FIGS. 3–7.

It is to be noted that in FIGS. 3–7 the terminal portions 20 shown in FIG. 1, queue portions 60a–60f corresponding to the queue portion 60 (see FIG. 2) included in the queue management module portions 22 and 23 on the input and the output side, and the switch portion 14 are only shown and that the other functional portions are omitted for the convenience's sake of explanation.

Figure 3:
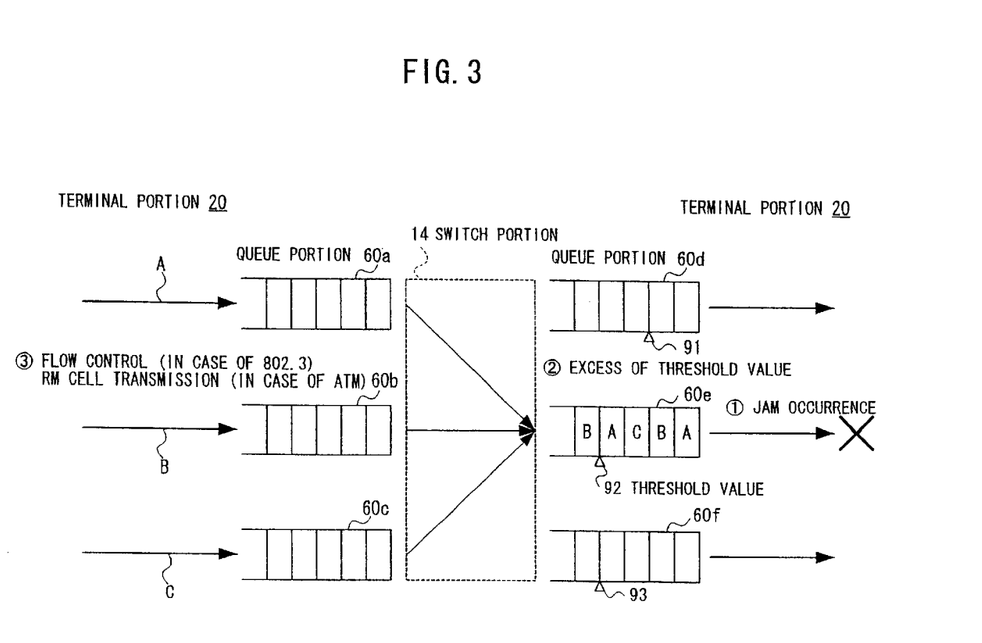
FIG. 3 is a diagram showing an example of a flow control (1) in a LAN relaying/switching apparatus according to the present invention.

In FIG. 3 showing the flow control example (1), the terminal portion 20 of the interface 10 (see FIG. 1) inputting e.g. an address data (hereinafter simply referred to as data) "A" transfers the data "A" to the queue portion 60a included in the queue management module portion 22 on the input side. The queue portion 60a transmits the data "A" to e.g. the interface 13 through the path set in the switch portion 14.

In the interface 13, the data "A" is received by the queue portion 60e included in the queue management module portion 23 on the output side to be transmitted from a predetermined transmission line through the terminal portion 20.

It is to be noted that the terminal portions 20 on the input side of the interface 10 and on the output side of the interface 13 may comprise terminal portions of respectively different interfaces such as an ATM terminal portion and a terminal portion based on the IEEE802.3, as mentioned later.

In FIG. 3, data "A", "B" and "C" inputted from the terminal portions 20 of the interfaces 10–12 are queued at the queue portions 60a, 60b, and 60c, switched at the switch portion 14, and then temporarily stored in the queue portion 60e of the interface 13 in the order of the data "A", "B", "C", "A" and "B" as shown in FIG. 3, which are transmitted to the transmission line through the terminal portion 20.

At this time, the transmission line assumes a jam state ① so that at the queue portion 60e the queue of the data "B" exceeds a preset threshold value 92, as shown by ②. This state is detected by the queue length management portions 54 (see FIG. 2) so that the frame information 85 and the threshold value exceeding notification 86 of the data "B" are transmitted to the controller 16 (see FIG. 1).

The controller 16 identifies the data flow which has transmitted the data "B" based on the frame information 85 and specifies the terminal portion 20 which has inputted the data flow.

When it is found that the terminal portion 20 is a terminal portion based on the IEEE802.3, the controller 16 transmits a corresponding flow control signal ③. When it is found that the terminal portion 20 is an ATM terminal portion, the controller 16 transmits an RM cell ③.

The external apparatus (LAN relaying/switching apparatus) on the preceding stage which has received the flow control signal or the RM cell suppresses the transmission of the proper data flow. As a result, the data amount transmitted from the queue portion 60e decreases so that the jam state of the transmission line is released.

FIGS. 8A–8D and 9A–9C show field examples which the flow identification portion 50 (see FIG. 2) refers to in order to identify data flows.

FIGS. 8A–8D show format examples of the MAC frame and respectively show the IEEE802.2/802.3 type format with tags, the IEEE802.2/802.3 type format without tags, the Ethernet type format with tags, and the Ethernet type format without tags.

In case of formats without tags, the flow identification portion 50 identifies addresses and data flows based on one of the data fields of a destination MAC address 40, a source MAC address 41, and a protocol type 44. In case of formats with tags, the flow identification portion 50 identifies the addresses and the data flows based on one of the data fields of the destination MAC address 40, the source MAC address 41, and the protocol type 44, a protocol identifier 42, and control information 43.

The controller 16 having received the frame information 85 can specify a source by e.g. the content of the source address 41, find a terminal portion to which the specified source is connected, and perform the flow control transmitting a signal for suppressing the data transmission only to the terminal portion.

Also, in an environment where a large-scale computer, a personal computer, a work station and such exist together, the controller 16 can distinguish the communications of the large-scale computer, the personal computer, and the work station based on the protocol type 44.

For instance, it is possible to transmit a signal for suppressing the data transmission to all of the terminal portions which input a data flow with a specific protocol and to remove a jam due to the data of a group of personal computers which mutually perform the data transmission with the specific protocol.

Furthermore, it is also possible to identify the data flows by combining address fields of the destination and the source addresses 40 and 41.

Figure 9A:
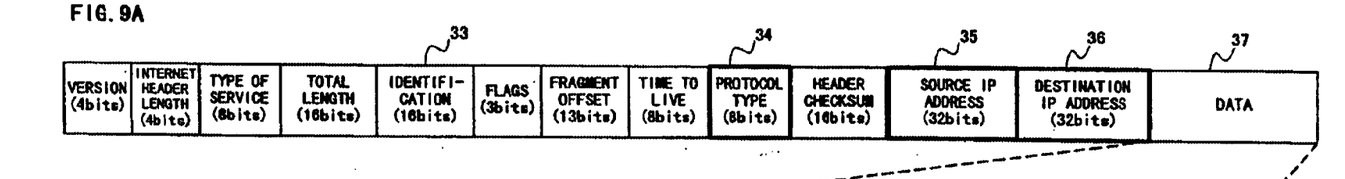
FIGS. 9A–9C are format diagrams showing information for identifying a terminal portion/data flow in an IP frame.
Figure 9B:
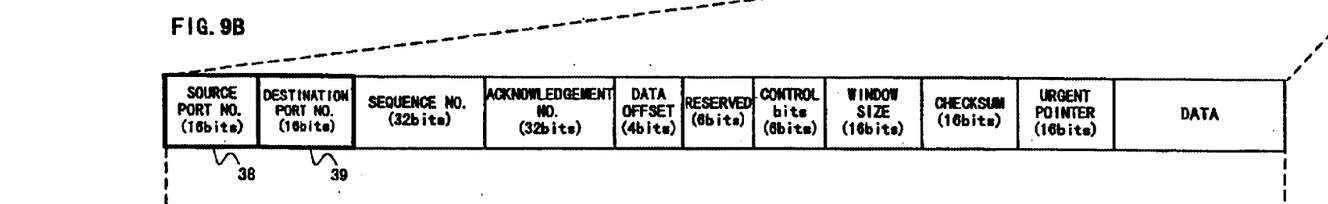
Figure 9C:
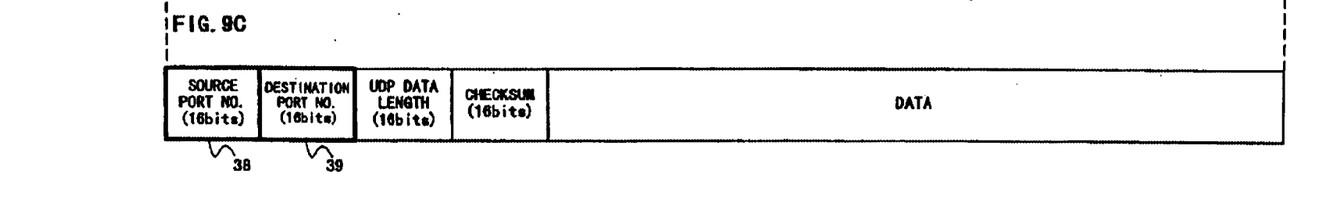

FIGS. 9A–9C show format examples of the IPv4 frame form. The basic format of the IPv4 frame type is shown in FIG. 9A.

The IPv4 frame has frames of a TCP type and a UPD type whose data structures 37 are respectively shown as enlarged in FIGS. 9B and 9C.

The flow identification portion 50 can identify the data flows, the terminal portions, the port numbers and such based on one of an identifier 33, a protocol type 34, a destination IP address 35, a source IP address 36, a source port number 38, and a destination port number 39 of the IPv4 frame.

It is to be noted that the flow identification portion 50 can identify the data flows, the terminal portions, the port numbers and such based on either a virtual path (VPI) or a virtual connection (VCI) by referring to the VPI and VCI fields of the ATM cell although not shown.

Figure 4:
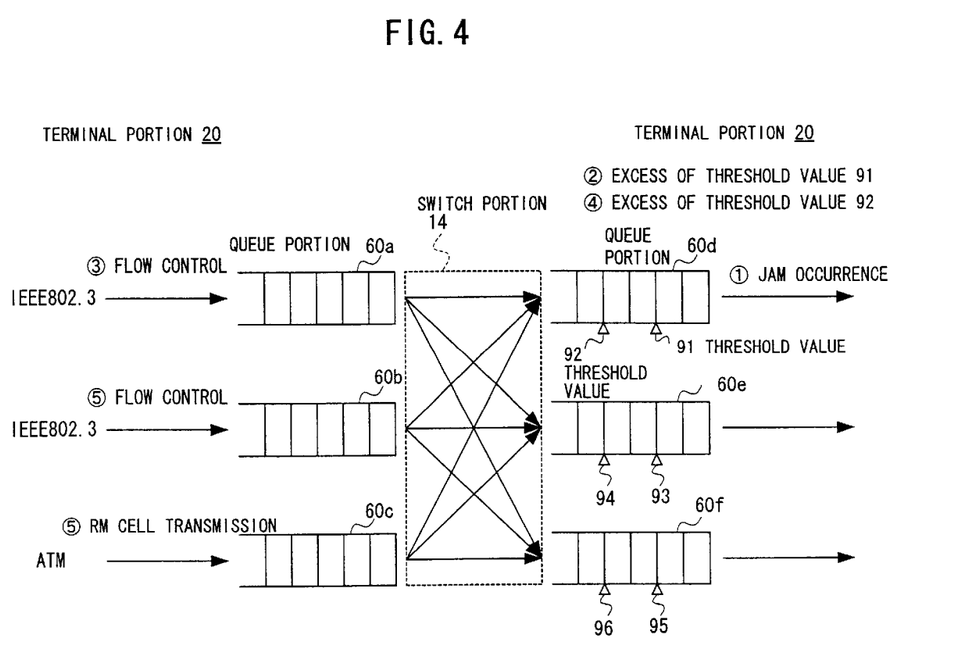
FIG. 4 is a diagram showing an example of a flow control (2) in a LAN relaying/switching apparatus according to the present invention.

Hereinafter, the flow control example (2) of the present invention using a plurality of threshold values will be described referring to FIG. 4.

In this example, the terminal portions 20 on the input side of the queue portions 60a–60c are respectively the terminal portion based on the IEEE802.3, the terminal portion based on the IEEE802.3, and the ATM terminal portion.

The data from the queue portions 60a–60c is switched by the switch portion 14 and transmitted to the queue portions 60d–60f on the output side, which is transmitted from each of the terminal portions 20.

Two threshold values 91 and 92, 93 and 94, as well as 95 and 96 are respectively set in the queue portions 60d–60f.

When a jam ① occurs in the output transmission line of the queue portion 60d at this time, the queue of the queue portion 60d firstly exceeds the threshold value 91 as shown by ②. The controller 16 which has recognized the state by the frame information 85 and the threshold value exceeding notification 86 requests the terminal portion 20 based on the IEEE802.3 on the input side to transmit the flow control signal. The terminal portion 20 which has received the request performs the flow control ③ designated by the IEEE802.3x and the IEEE802.3z.

This operation enables the data flow mainly causing the jam ① to be suppressed and the jam to be removed or relieved. This removal or relief enables the data of the data flow which is not concerned in the jam to be normally transmitted.

When the jam ① is not removed in spite of the flow control ①, the queue of the queue portion 60d exceeds the threshold value 92 as shown by ④. The controller 16 which has recognized the state further requests another terminal portion 20 based on the IEEE802.3 on the input side which transmits the data to the queue portion 60d to transmit a flow control signal ④ and requests the ATM terminal portion 20 to transmit an RM cell ⑤.

This enables the data flow causing jams to be further suppressed and the jams to be removed.

Figure 5A:
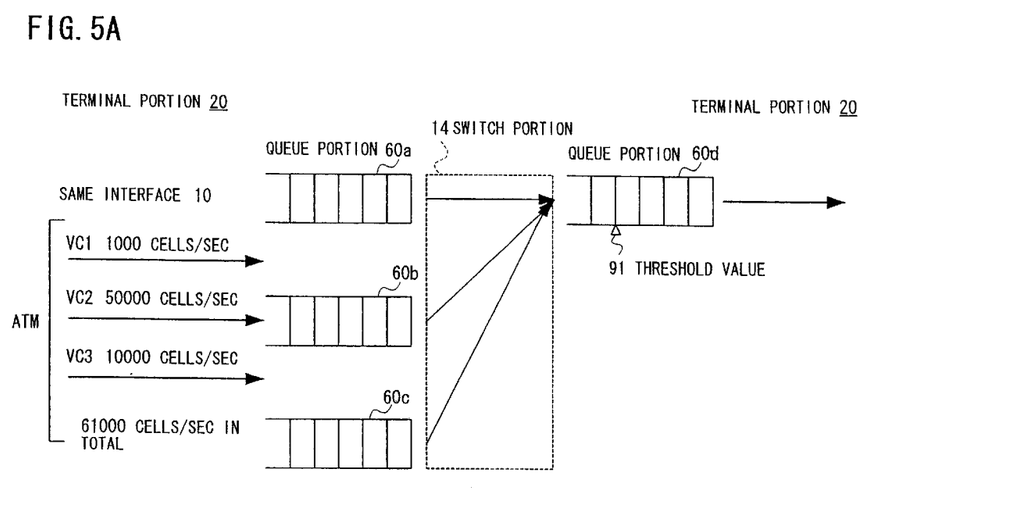
FIGS. 5A and 5B are diagrams showing an example of a flow control (3) in a LAN relaying/switching apparatus according to the present invention.
Figure 5B:
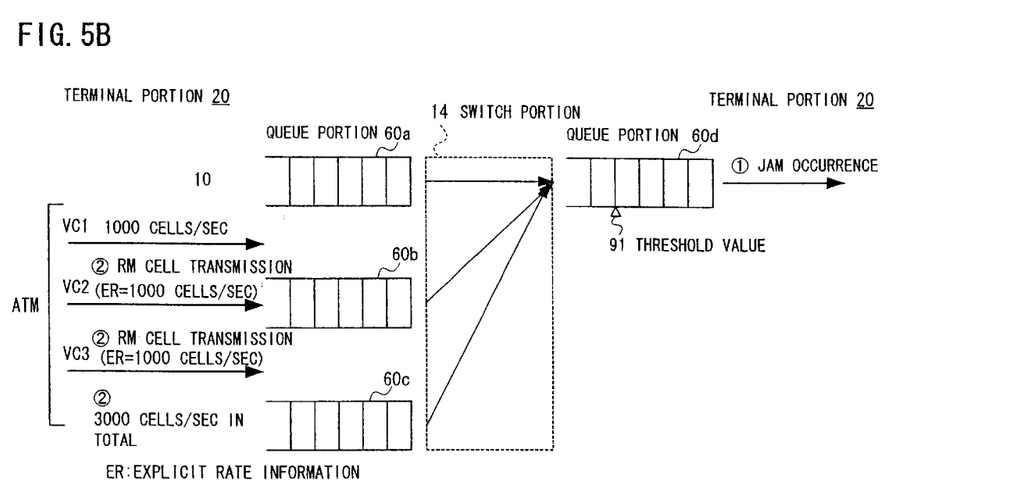

FIGS. 5A and 5B show the flow control example (3) of the present invention. This control example specifically shows the flow control example (1) shown in FIG. 3. In an ABR (Available Bit Rate) service of the ATM, a band control is performed with an ER (Explicit Rate: explicit rate information) field of the RM cell in each virtual connection. It is to be noted that the ABR service is one for regulating a PCR (Peak Cell Rate) according to a jam state of the network.

FIG. 5A shows a data flow at a normal operation, in which 1000 cells/sec, 50000 cells/sec, and 10000 cells/sec are respectively reported as the PCR's of virtual connections VC1, VC2, and VC3 accommodated in the ATM terminal portion 20 of the same interface 10.

The data of 61000 cells/sec in total is transmitted to the output transmission line through the switch portion 14 and the queue portion 60d.

FIG. 5B shows a data flow when a jam state ① occurs in the output transmission line.

In this jam state ①, the queue of the queue portion 60d exceeds the threshold value 91. The queue management module portion 22 which has detected this state provides the frame information 85 of the data flow after exceeding the threshold value 91 to the controller 16.

The controller 16 recognizes based on arrangement information that the corresponding frame is inputted via the virtual connection the ATM terminal portion accommodates. The controller 16 sets a cell transfer speed=1000 cells/sec in the ER fields of RM cells ② for the relevant virtual connections VC2 and VC3 to transmit the RM cells.

Thus, the transfer speed in total transmitted to the queue portion 60d assumes 3000 cells/sec to enable to the jam state ① to be removed.

It is to be noted that in the flow control example the terminal portion 20 on the output side can be either the terminal portion based on the IEEE802.3 or the ATM terminal portion.

Figure 6A:
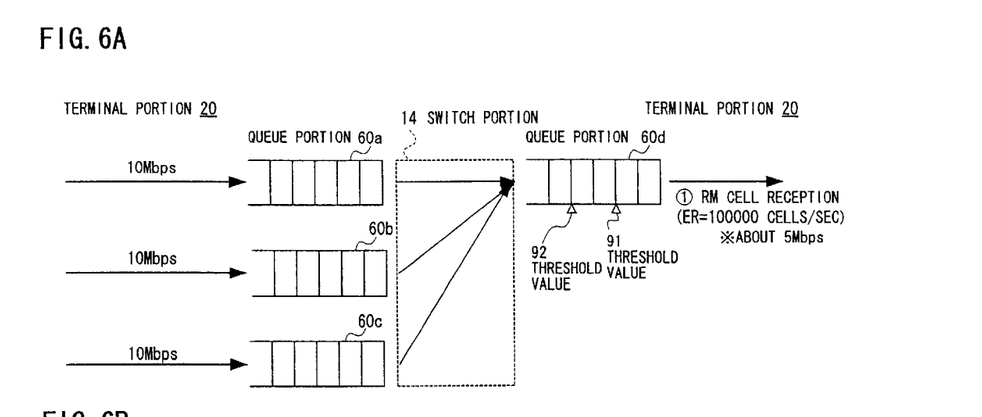
FIGS. 6A–6C are diagrams showing an example of a flow control (4) in a LAN relaying/switching apparatus according to the present invention.
Figure 6B:
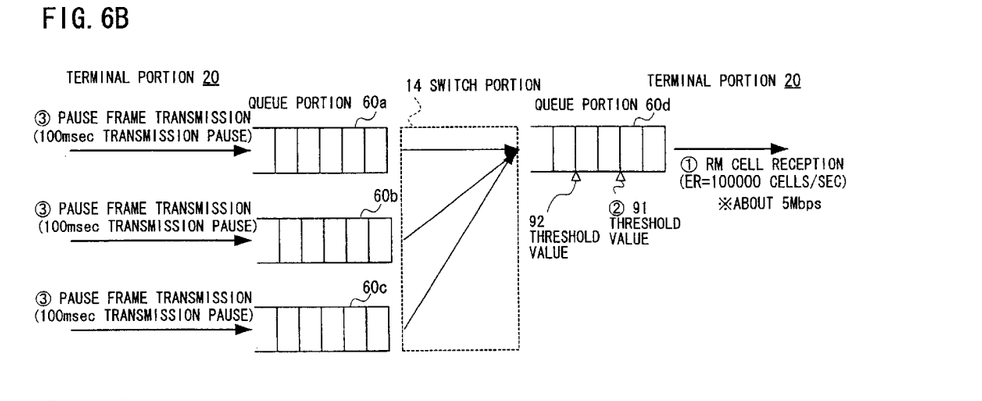
Figure 6C:
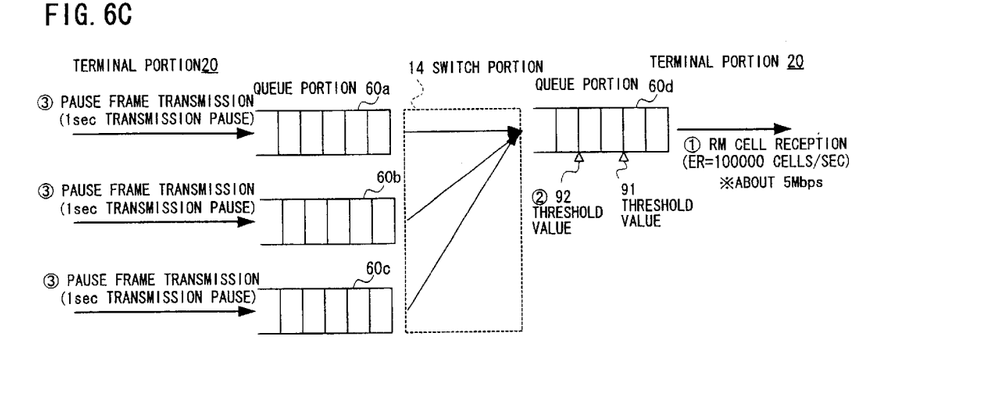

FIGS. 6A–6C show the flow control example (4) of the present invention. This control example specifically shows the flow control example (2) shown in FIG. 4. This is a control example in the LAN relaying/switching apparatus which has received the RM cell, which has designated the cell transfer speed (=output band width) at the ER fields shown in FIGS. 5A and 5B, at the ATM terminal portion on the output side.

In FIG. 6A, the controller 16 of the apparatus sets the band width of the ATM terminal portion on the output side which has received an RM cell ① to 10000 cells/sec designated by the received ER field.

In FIG. 6B, since the output band width of the ATM terminal portion on the output side becomes narrower as shown by ②, the queue of the queue portion 60d exceeds the threshold value 91.

The controller 16 requests the terminal portions 20 based on the IEEE802.3 on the input side which transmit the data to the queue portion 60d to transmit a pause frame indicating that the transmission of the frame should be stopped for only 100 ms. The terminal portions 20 perform the flow control for transmitting a pause frame ③ to the transmission line.

This enables the jam of the transmission line on the output side to be removed.

FIG. 6C shows a flow control when the jam is not removed by the above-mentioned flow control. In this case, the queue of the queue portion 60d exceeds the threshold value 92 as shown by ②.

The controller 16 recognizes that the jam is not removed by the transmission pause for e.g. 100 ms and requests the terminal portions 20 to transmit the pause frame indicating that the transmission should be further stopped for e.g. only one second. The terminal portions 20 perform the flow control for transmitting the pause frame ③ to the transmission line.

This enables the jam of the transmission line on the output side to be removed more certainly.

Also, the adjustment of the transmission pause time corresponding to the threshold value enables the duration of a jam which occurs on the transmission line to be shortened and the network to be efficiently used.

Figure 7A:
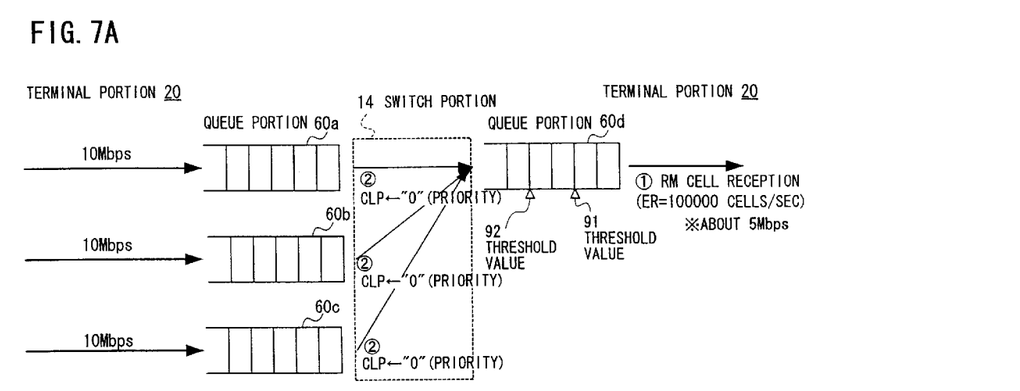
FIGS. 7A–7C are diagrams showing an example of a flow control (5) in a LAN relaying/switching apparatus according to the present invention.
Figure 7B:
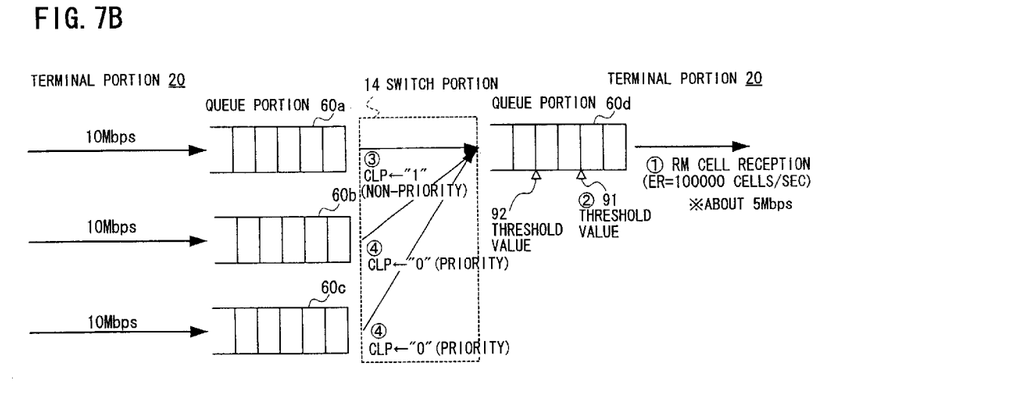
Figure 7C:
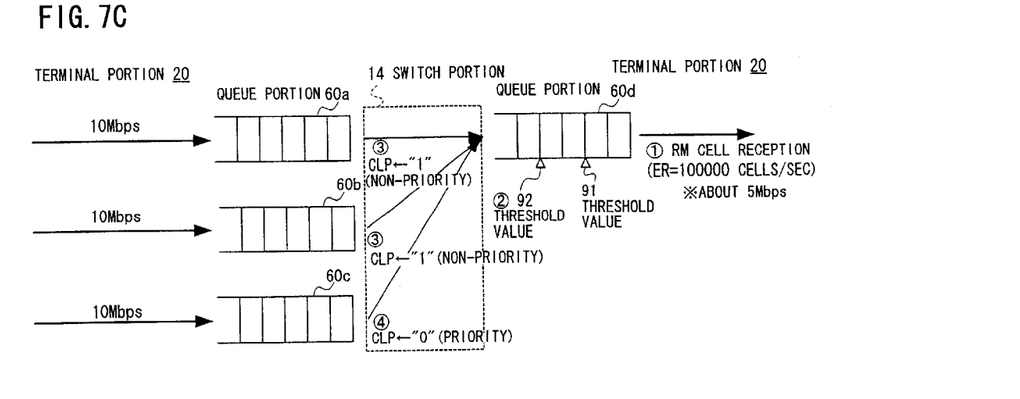
Figure 8A:
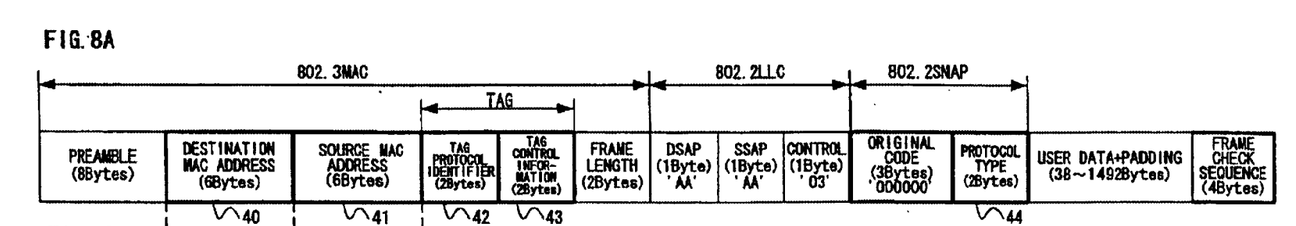
FIGS. 8A–8D are format diagrams showing information for identifying a terminal portion/data flow in an MAC frame.
Figure 8B:
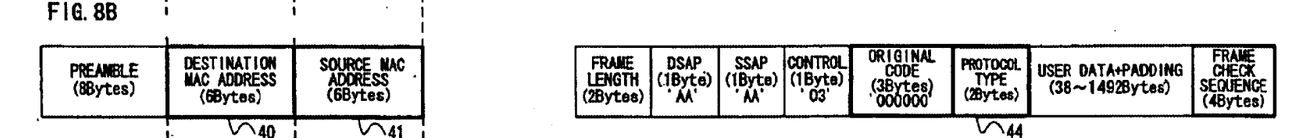
Figure 8C:
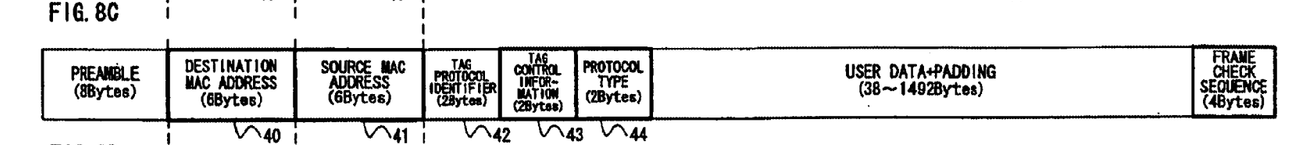
Figure 8D:
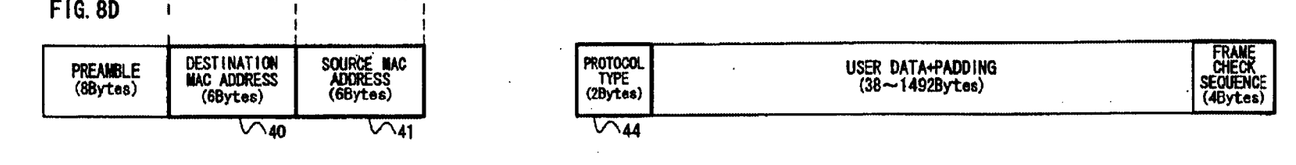

FIGS. 7A–7C show the flow control example (5) of the present invention. This control example shows a modification of the flow control example (4) shown in FIGS. 6A–6C, and in turn a case where the terminal portion 20 on the output side receives the RM cell designating the output band width in the same way as the flow control example (4). However, different from the flow control example (4), the LAN relaying/switching apparatus which receives the cell is entrusted with whether or not the data cell is discarded by setting the priority of the cells to be outputted, instead of suppressing the data by transmitting the pause frame to the terminal portions 20 on the input side.

In FIG. 7A, the queue portions 60a–60c set the CLP fields in the cell format indicating the cell priority degree to 0="priority" and transmit the cells to the queue portion 60d through the switch portion 14.

The cell where the CLP is set to "priority" indicates a cell which should not be discarded.

When the ATM terminal portion 20 on the output side receives an RM cell ① designating the cell transfer speed= 100000 cells/sec, the controller 16 sets the cell transfer speed (band width) of the terminal portion 20 to 100000 cells/sec.

In FIG. 7B, a jam occurs in the LAN relaying/switching apparatus whose band width on the output side is limited so that the queue of the queue portion 60d exceeds the threshold value 91 as shown by ②.

The controller 16 which has detected this state sets the CLP field of the cell transmitted from the queue portion 60a to 1="non-priority" and transmits the cells transmitted from the queue portions 60b and 60c with their CLP's being kept "priority".

When a jam occurs, the LAN relaying/switching apparatus at the next stage which has received the cells discards the cells with the CLP's="non-priority" to remove the jam state.

In FIG. 7C, when the jam state is not removed by the above-mentioned control, the LAN relaying/switching apparatus at the next stage transmits the RM cell ① to the identified relaying/switching apparatus.

Since the jam in the apparatus is not removed, the queue of the queue portion 60d exceeds the threshold value 92 as shown by ②. Having detected the state, the controller 16 further sets the CLP field of the cell to be transmitted from the queue portion 60d to 1="non-priority".

Thus, in the occurrence of jam, the LAN relaying/ switching apparatus at the next stage can discard more cells whose CLP's are set to "non-priority" so that the possibility of removing the jam state is enhanced.

It is to be noted that while in this control example the CLP is set for every terminal portion 20, it is possible to change the setting of the CLP of cell in IP or MAC address of specific terminal portions 20.

As described above, a LAN relaying/switching apparatus according to the present invention is arranged such that a controller performs a flow control which limits a data transmission for terminal portions which have inputted the data in which an output queue of a queue portion has exceeded a preset threshold value. Therefore, it becomes possible to suppress the spread of jams occurred in a part of the transmission lines to the other normal ones.

I claim:

1. A LAN relaying/switching apparatus comprising:
   a plurality of terminal portions for inputting data from an external apparatus;
   a queue management portion for performing an input/ output management for a switch portion of the data; and
   a controller for performing a flow control which limits a data transmission for the terminal portions which have inputted the data which has caused an output queue of the queue management portion to exceed a preset threshold value.

2. The LAN relaying/switching apparatus as claimed in claim 1 wherein the controller identified a real terminal portion based on an MAC address included in the data which has exceeded the threshold value.

3. The LAN relaying/switching apparatus as claimed in claim 1 wherein the controller identifies a real terminal portion based on an IP address included in the data which has exceeded the threshold value.

4. The LAN relaying/switching apparatus as claimed in claim 1 wherein the controller identifies a real terminal portion based on protocol type information included in the data which has exceeded the threshold value.

5. A LAN relaying/switching apparatus comprising;
   a plurality of terminal portions for inputting data from an external apparatus;
   a queue management portion for performing an input/ output management for a switch portion of the data; and
   a controller for performing a flow control which limits a specific data flow, from the terminal portions, which has caused an output queue of the queue management portion to exceed a preset threshold value.

6. The LAN relaying/switching apparatus as claimed in claim 5 wherein the controller identifies the specific data flow based on an MAC address.

7. The LAN relaying/switching apparatus as claimed in claim 5 wherein the controller identifies the specific data flow based on an IP address.

8. The LAN relaying/switching apparatus as claimed in claim 5 wherein the controller identifies the specific data flow based on protocol type information.

9. The LAN relaying/switching apparatus as claimed in claim 5 wherein the controller identifies the specific data flow based on a TCP or UDP port number.

10. The LAN relaying/switching apparatus as claimed in claim 5 wherein the controller identifies the specific data flow based on a flow label in IPv6.

11. The LAN relaying/switching apparatus as claimed in claim 5 wherein the controller identifies the specific data flow based on one of VPI and VCI information in ATM.

12. The LAN relaying/switching apparatus as claimed in claim 5 wherein when any one of a plurality of threshold values which are preset is exceeded, the controller performs the flow control which limits the specific data flow.

13. A LAN relaying/switching apparatus comprising;
    a plurality of terminal portions for inputting data from an external apparatus;
    a queue management portion for performing an input/ output management for a switch portion of the data; and
    a controller for identifying the terminal portions based on address information included in the data which has caused an output queue of the queue management portion to exceed each of a plurality of preset threshold values and for performing a flow control which limits a data transmission based on statistic information of a traffic amount for the identified terminal portion at the time when any one of the threshold values is exceeded.

14. A LAN relaying/switching apparatus comprising;
    a plurality of terminal portions including an ATM terminal portion for inputting data from an external apparatus;
    a queue management portion for performing an input/ output management for a switch portion of the data; and a controller for transmitting an RM cell so as to limit a specific data flow from the ATM terminal portion when a data flow has caused an output queue of the queue management portion to exceed a preset threshold value is the specific data flow from the ATM terminal portion.

15. The LAN relaying/switching apparatus as claimed in claim 14 wherein when the queue of the queue management portion which transmits the specific data flow has exceeded a preset threshold value and the specific data flow is a data flow from the terminal portion based on IEEE802.3, the controller which has received the RM cell performs a flow control so as to temporarily pause the data flow.

16. The LAN relaying/switching apparatus as claimed in claim 14 wherein when the queue of the queue management portion which transmits the specific data flow has exceeded a preset threshold value, the controller which has received the RM cell performs a flow control to set a CLP bit of cell in the specific data flow to non-priority.

17. The LAN relaying/switching apparatus as claimed in claim 16 wherein when a plurality of threshold values exist and the queue has exceeded one of the threshold values, the controller sets the CLP bit to non-priority corresponding to the threshold value.

* * * * *